United States Patent [19]

Hull

[11] Patent Number: 5,117,558
[45] Date of Patent: Jun. 2, 1992

[54] HAND-HELD ROTARY BARBECUE ROTISSERIE

[76] Inventor: Robert D. Hull, 6900 Almond Ave. #113, Orangevale, Calif. 95662

[21] Appl. No.: 753,919

[22] Filed: Sep. 3, 1991

[51] Int. Cl.⁵ .............................................. A47J 43/28
[52] U.S. Cl. ................................. 30/323; 99/421 R; 99/421 H
[58] Field of Search .................... 30/142, 322, 323; 99/419, 421 R, 421 A, 421 H; 294/35.5

[56] References Cited

U.S. PATENT DOCUMENTS

| | | | |
|---|---|---|---|
| 2,876,694 | 3/1959 | Thomas | 99/421 A |
| 3,745,910 | 7/1973 | Delamater | 99/419 |
| 3,931,758 | 1/1976 | Blake | 99/419 |
| 4,126,086 | 11/1978 | Valade | 99/419 |
| 4,258,617 | 3/1981 | Akwei | 99/419 |
| 4,332,409 | 6/1982 | Stachowiez | 294/2 |
| 4,446,777 | 5/1984 | Grigorenko | 99/419 |
| 4,539,751 | 9/1985 | Chan | 30/323 X |
| 4,599,797 | 7/1986 | Bax | 30/323 |
| 4,716,592 | 12/1979 | Doyle | 99/419 |

Primary Examiner—Douglas D. Watts

[57] ABSTRACT

The hand-held Rotary Barbecue Rotisserie" includes an elongated shaft having multiple prongs on which wieners, marshmallows, or other food is impaled for cooking. The shaft end opposite the cooking prongs is formed in to an eccentric crank handle, this crank is used for turning the cooking food. a heat insulting sleeve is placed on the shaft. This sleeve would typically be held in one hand while the other hand would rotate the crank handle. The shaft can be one single piece or can be separated into smaller components for easier storage.

4 Claims, 2 Drawing Sheets

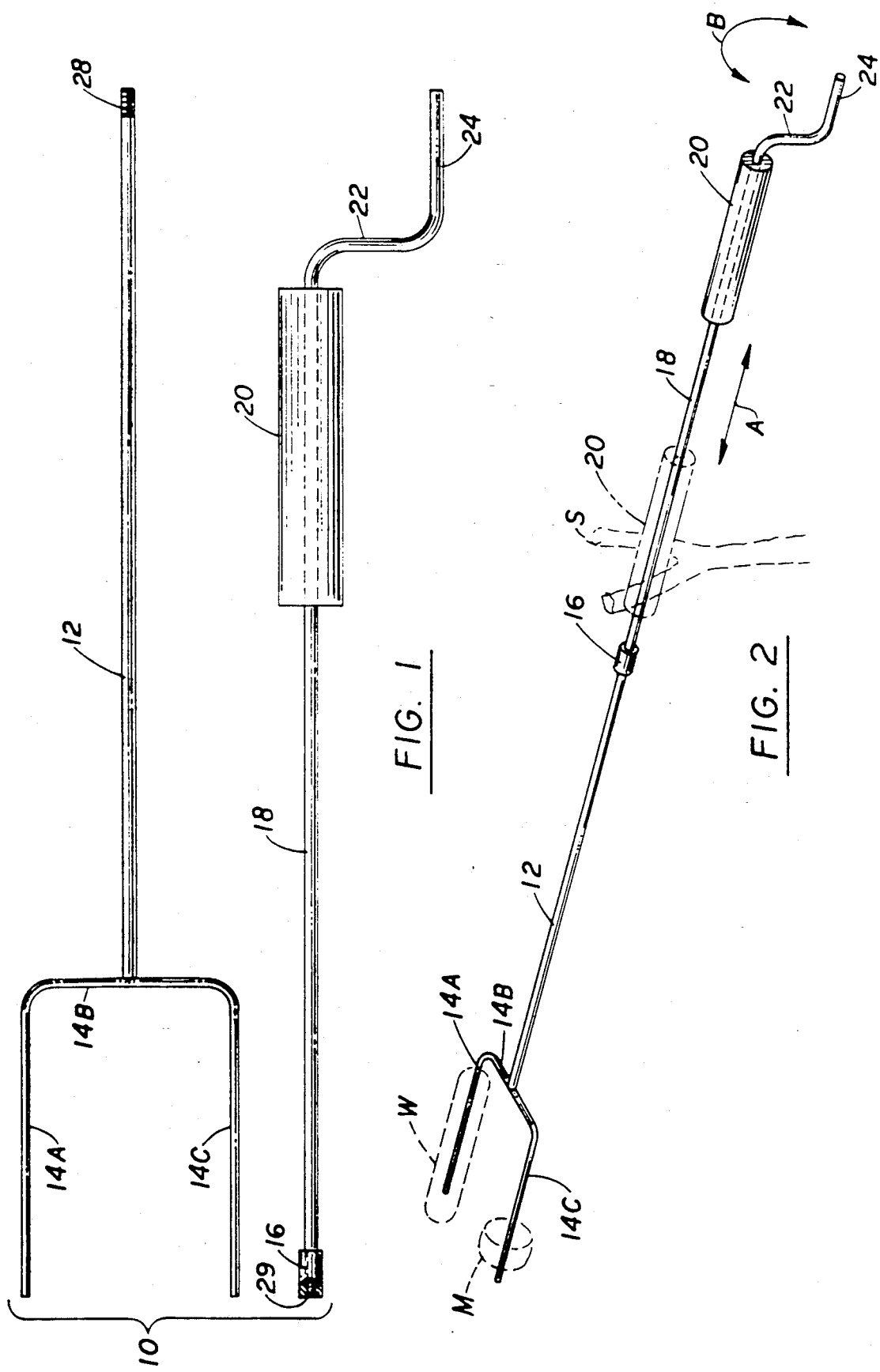

HAND-HELD ROTARY BARBECUE ROTISSERIE

BACKGROUND OF THE INVENTION

This device relates to barbecue spits that are hand-held and rotated by means of a hand crank. The first embodiment is a take-down device suitable for backpacking, or storing in a confined area. The other embodiment is a simpler rigid device.

A typical usage would be for cooking wieners (hot dogs), marshmallows, or other meats and foods over an exposed heat source. A typical method of using it would be to hold the device by the heat insulating rotational sleeve handle with one hand and rotating the food by turning the crank handle with the other hand. An alternate usage would be to rest the rotational sleeve in the fork of a stick, or other rigid surface and rotating the crank handle, hand-held spits, forks, Prior Art contains many types of hand-held spits, forks, skewers, etc. used for cooking For example referenced U.S. Pat. No. 3,745,910 is a device similar in appearance but lacks a crank for turning and its mid shaft handle is used for ejecting cooked food.

U.S. Pat. No. 4,539,751 is a barbecue fork that can be reduced in length by dissemble of a threaded shaft but lacks a crank mechanism for ease of rotation.

U.S. Pat. No. 2,876,694 is a "Marshmallow and Hot Dog Roasting Stick:" comprising a button or crank handle, a narrow fork with sharp prongs, and with a hand-grip having a slot or recess that is used to prevent rotation and/or protect the sharp prongs. U.S. Pat. No. 4,599,797 is a rotating fork suitable for eating spaghetti but the thumb wheel actuator would not provide enough torque for rotating a hand-held barbecue rotisserie. Also, it would not be long enough to protect the user from burns.

SUMMARY AND ADVANTAGES OF INVENTION

This invention provides an easy, safe, and enjoyable method for roasting, and toasting food over an open fire or infra-red radiating heat source. The device has prongs on which food is impaled. The device has a long shaft which has a sleeve with two degrees of freedom. One degree freedom allows for rotation within the sleeve and the other degree of freedom allows for linear motion of the sleeve in relation to the shaft. The shaft is attached to the cooking prongs on one end and has a shaft offset forming a crank handle on the other end. The sleeve would typically be held in one hand and the other hand would rotate the crank handle. The linear motion of the sleeve allows for better balancing the food weight, and reduces hand and arm strain so typical with hand-held barbecue spits. The crank handle allows for easy rotation of the spit, even when the food is extremely unbalanced.

BRIEF DESCRIPTION OF FIGURES

FIG. 1 is the disassembled plan view of the first embodiment "Hand-Held Rotary Barbecue Rotisserie."

FIG. 2 is the prospective view of the assembled first embodiment illustrating its use.

DETAILED DESCRIPTION OF PREFERRED EMBODIMENTS

Figure 3:
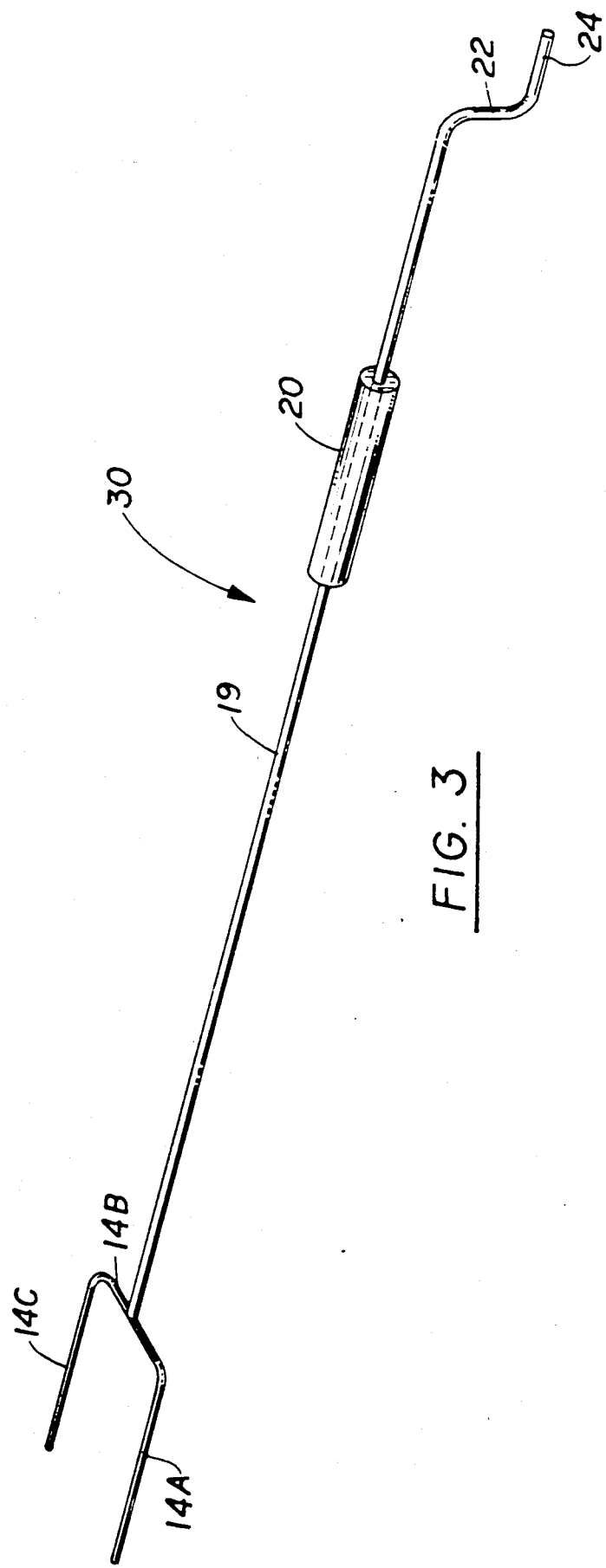
FIG. 3 is the prospective view of the second embodiment of the "Hand Held Rotary Barbecue Rotisserie."

The rotary barbecue rotisserie 30 shown in FIG. 3, has a metal shaft 19 that is bent at two right angles to form an offset and a handle 24. A sleeve 20, made from thermal insulating material, having a concentric hole slightly larger in diameter the shaft diameter, encircles the shaft. A rod is mechanically formed to provide two blunt prongs 14A and 14C, with a bridge 14B between the prongs. The shaft 19 is bonded to the bridge 14B. Food for cooking such as wieners, small fowl, marshmallows, etc. is placed on the prongs, and typically the sleeve would be held in one hand and the other hand would rotate the handle to allow for even multi-directional cooking from an open fire or barbecue source.

The rotary barbecue rotisserie 10 shown in FIG. 1 is the "take-down" version of 30 and would typically be used for back packing, camping, or where only limited storage is available. The rotary barbecue rotisserie 10 shown in FIG. 1, has a metal shaft 18 that is bent at two right angles to form an offset 22 and a handle 24. A sleeve 20, made from thermal insulating material, having a concentric hole slightly larger in diameter than the shaft diameter, encircles the shaft. A coupling 16 having female threads 29 is attached to shaft 18.

A rod is mechanically formed to provide two blunt prongs 14A and 14C, with a bridge 14B between the prongs. A second shaft 12 is bonded to the bridge 14B. Said second shaft 12 has male threads 28 on the opposite end.

FIG. 2 is the assembled Hand Held Rotary Barbecue Rotisserie illustrated in FIG. 1. This figure illustrates shaft 12 coupled to shaft 18 by being threaded into coupling 16. To illustrate a possible usage a marshmallow M is shown on prong 14C and a wiener W is shown on prong 14A. FIG. 2. also illustrates a usage in which sleeve 20 is linearly slid on shaft 18, such that the sleeve 20 is resting in the fork of a stick S. The double arrow A illustrates the linear motion of shaft 18 relative to the sleeve 20. The double headed circular arrow B illustrates the rotational motion of shaft 18 relative to the sleeve 20.

REFERENCE FIGURE NUMBERS:

10—Invention First Embodiment
12—Shaft, Prong End
14A—Prong
14B—Bridge
14C—Prong
16—Coupler
18—Shaft, Handle End
19—Shaft, One Piece
20—Sleeve
22—Offset Shaft
24—Handle
28—Thread-Male
29—Thread-Female
30—One Piece Shaft Assembly, Second Embodiment
A—Arrow Showing Motion of sleeve
B—Arrow Showing Turning Motion of Handle
M—Marshmallow
S—Stick acts as Fulcrum
W—Wiener

I claim:

1. A hand-held rotary barbecue rotisserie comprising an elongated shaft, having a plurality of blunt prongs at the forward end on which food is impaled for cooking, the butt end of said elongated shaft is bent at two right angles forming a crank handle; surrounding the elongated shaft is a sleeve;

whereas, when said crank handling is rotated, the elongated shaft and said blunt prongs at the forward end of the shaft also rotate, but said sleeve is free to not rotate, and free to slide linearly on the elongated shaft;

the sleeve, would typically be used as a second handle, and has dimensions in length and circumference such as to comfortably accommodate the human hand;

the length of the elongated shaft is such as to provide the user protection from a barbecue heat source;

the blunt prongs are parallel with the elongated shaft;

the blunt prongs are long enough such that hot dogs can be impaled length ways, and are separated at a distance such that a small fowl could be impaled for roasting.

2. A hand-held rotary barbecue rotisserie according to claim 1, in which the sleeve is made from heat resistant material.

3. A hand-held rotary barbecue rotisserie capable of being separated into two components for easier transport and storage, a first component comprises an elongated shaft having two right angle bends forming a crank handle on one end, and screw threads at the other end, affixed to said screw threads is an internally screw threaded coupling; between said screw threads and said two right angle bends is a sleeve which would also be used as a handle;

said sleeve is essentially cylindrical in shape having a center bore such that it encircles the elongated shaft, and is free to slide linearly on the elongated shaft and to rotate in relation to the elongated shaft;

the sleeve, has dimensions in length and circumference such as to comfortably accommodate the human hand;

a second component comprises a second elongated shaft having screw threads on one end and a plurality of prongs on the other end, said prongs are blunt and are long enough such that hot dogs can be impaled length ways, the prongs are separated at a distance such that a small fowl could be impaled for roasting.

said rotisserie is assembly by screwing said screw threads of said second elongated shaft into said internally threaded coupling of said first component;

the lengths of the first component and the second component are such that when assembled end to end the user is provided protection from a barbecue heat source.

4. A hand-held rotary barbecue rotisserie according to claim 3 in which the sleeve is made from heat resistant material.

* * * * *